United States Patent [19]

Iizuka

[11] Patent Number: 4,898,483

[45] Date of Patent: Feb. 6, 1990

[54] ELECTRONIC TYPEWRITER EQUIPPED WITH A PERSONAL COMPUTER

[75] Inventor: Taiji Iizuka, Nara, Japan

[73] Assignee: Sharp Kabushiki Kaisha, Osaka, Japan

[21] Appl. No.: 141,514

[22] Filed: Jan. 7, 1988

[30] Foreign Application Priority Data

Jan. 9, 1987 [JP] Japan .................................. 62-3808

[51] Int. Cl.[4] .............................................. B41J 5/40
[52] U.S. Cl. ........................................ 400/61; 400/70; 400/83; 340/711; 364/131; 364/146; 364/189; 364/518
[58] Field of Search ...................... 400/61, 62, 63, 70, 400/71, 76, 77, 83, 88; 340/706, 711, 713, 716, 752, 767, 783, 784, 789, 793, 794, 798, 800; 364/131, 132, 133, 134, 135, 136, 140, 141, 146, 188, 189, 518, 519, 520, 521, 900 MS File

[56] References Cited

U.S. PATENT DOCUMENTS 4,651,300  3/1987  Suzuki et al. ...................... 364/900
4,742,485  5/1988  Carlson et al. ........................ 400/70

FOREIGN PATENT DOCUMENTS 0042895   6/1980   European Pat. Off. .
3314693  10/1984   Fed. Rep. of Germany ...... 340/784
3605721   8/1987   Fed. Rep. of Germany ........ 400/83
20795     2/1977   Japan .................................. 340/784
59-884    4/1983   Japan .................................... 400/83
104380    6/1985   Japan .................................... 400/63
211072    9/1986   Japan .................................... 400/70
2094050   9/1982   United Kingdom ................. 340/784
WO81/00987 4/1981  World Int. Prop. O. .

Primary Examiner—David A. Wiecking
Attorney, Agent, or Firm—Birch, Stewart, Kolasch & Birch

[57] ABSTRACT

An electronic typewriter equipped with a personal computer has a first processing unit which includes hardware capable of receiving software, such as a word processor program, so that the electronic typewriter can serve as a personal computer; a second processing unit which includes hardware capable of receiving software of an electronic typewriter; and a keyboard. A selection switch is provided for selecting between a personal computer mode and a typewriter mode. The selection switch allows the user to interrupt the personal computer mode to allow the insertion of a typewritten word onto the document being produced without destroying the process being carried in the personal computer mode.

6 Claims, 5 Drawing Sheets

ELECTRONIC TYPEWRITER EQUIPPED WITH A PERSONAL COMPUTER

BACKGROUND OF THE INVENTION

1. Field of the Invention

The present invention relates to an electronic typewriter, equipped with a computer functioning as a word processor or data processing system and a keyboard for use in used for both a typewriter mode and a computer mode, and more particularly, to a typewriter which operates either in the typewriter mode or the computer mode in response to a mode selection switch.

2. Description of the Prior Art

Conventionally, when using a personal computer loaded with an application program such as for a word processor, character data inputted via a keyboard is edited, displayed on a display, and printed by a printer connected to the personal computer, thereby forming a document. On the other hand, when using an electronic typewriter, character data inputted via keys of a keyboard is printed onto a sheet by a printing device according to a system program, thereby forming a document.

When typing a document using the word processor and it is required to insert sentences or words in a format different from the format presently set, the format must be changed. When it is required to type some short sentences or words immediately on a sheet, the word processor program must be ended.

SUMMARY OF THE INVENTION

The present invention has been developed with a to substantially solve the above-described disadvantages. Its essential objective is to provide an electronic typewriter equipped with a personal computer having a processing unit to process data according to an application program such as BASIC which is integrally constructed with a typewriter unit. This allows the present invention to function as both the printer of the processing unit and as the editing typewriter, whereby either the operation of the processing unit or the typewriter unit can be selected by a mode selection switch mounted on the present invention.

In order to accomplish these and other objectives, an electronic typewriter, equipped with a personal computer according to the present invention, comprises a first processing unit including a means for storing a user application program and display means for displaying the data processed according to the user application; a second processing unit, coupled to the first processing unit through an interface, for controlling a printer according to the data transferred from the interface; keyboard means including character input keys and function keys for use in the first processing unit and the second processing unit; selection switch means for selecting a mode in which either the first processing unit or the second processing unit is operated; and distribution means for distributing the key signal outputted from the keyboard means either to the first processing unit or the second processing unit according to the mode selected by the selection switch means, whereby either the first processing unit or the second processing unit is operated.

BRIEF DESCRIPTION OF THE DRAWINGS

These and other objectives and features of the present invention will become clear from the following description taken in conjunction with a preferred embodiment thereof with reference to the accompanying drawings, in which.

DETAILED DESCRIPTION OF THE INVENTION

Figure 1:
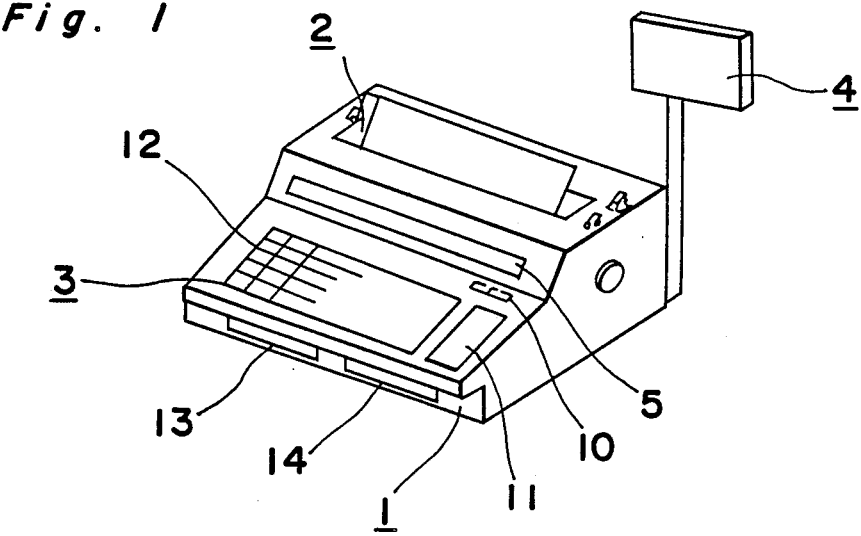
FIG. 1 is a perspective view of an electronic typewriter equipped with a personal computer according to the present invention.

Referring to FIG. 1, the perspective view of the electronic typewriter equipped with the personal computer PC typewriter, according to a preferred embodiment of the present invention, is shown. The PC typewriter comprises a computer portion 1, an electronic typewriter portion 2, and an alphanumeric keyboard portion 3.

The computer portion 1 includes slots 13 and 14 aligned side by side for receiving floppy disks and on which application programs or data to be processed by the computer are stored. The computer portion 1 further includes a display unit 4 for displaying the data to be processed and also for displaying the edited document when the PC typewriter is used as a word processor.

The electronic typewriter portion 2 includes a printer equipped with a daisy-wheel type element and a correction tape for erasing erroneous characters, and a one-line display 5 which displays, for example, one line of the typed characters. The electronic typewriter portion 2 functions both as an editing typewriter in the electronic typewriter mode, the typewriter mode, and as a printer in the personal computer mode, the PC mode.

The keyboard portion 3, used both in the typewriter mode and the PC mode, includes arrays of alphanumeric keys 12 aligned longitudinally and horizontally; a set of function keys 11 having various functions which are labelled at one side of the keys; and a mode selection key 10 which allows switching between the PC mode and the typewriter mode and vice versa. Some of the function keys are only used either in the PC mode or in the typewriter mode. The data produced by pressing any one of the keys 11 and 12 is transmitted either to CPU 201 or to CPU 301, depending on the mode selected by the mode selection key 10.

Figure 2:
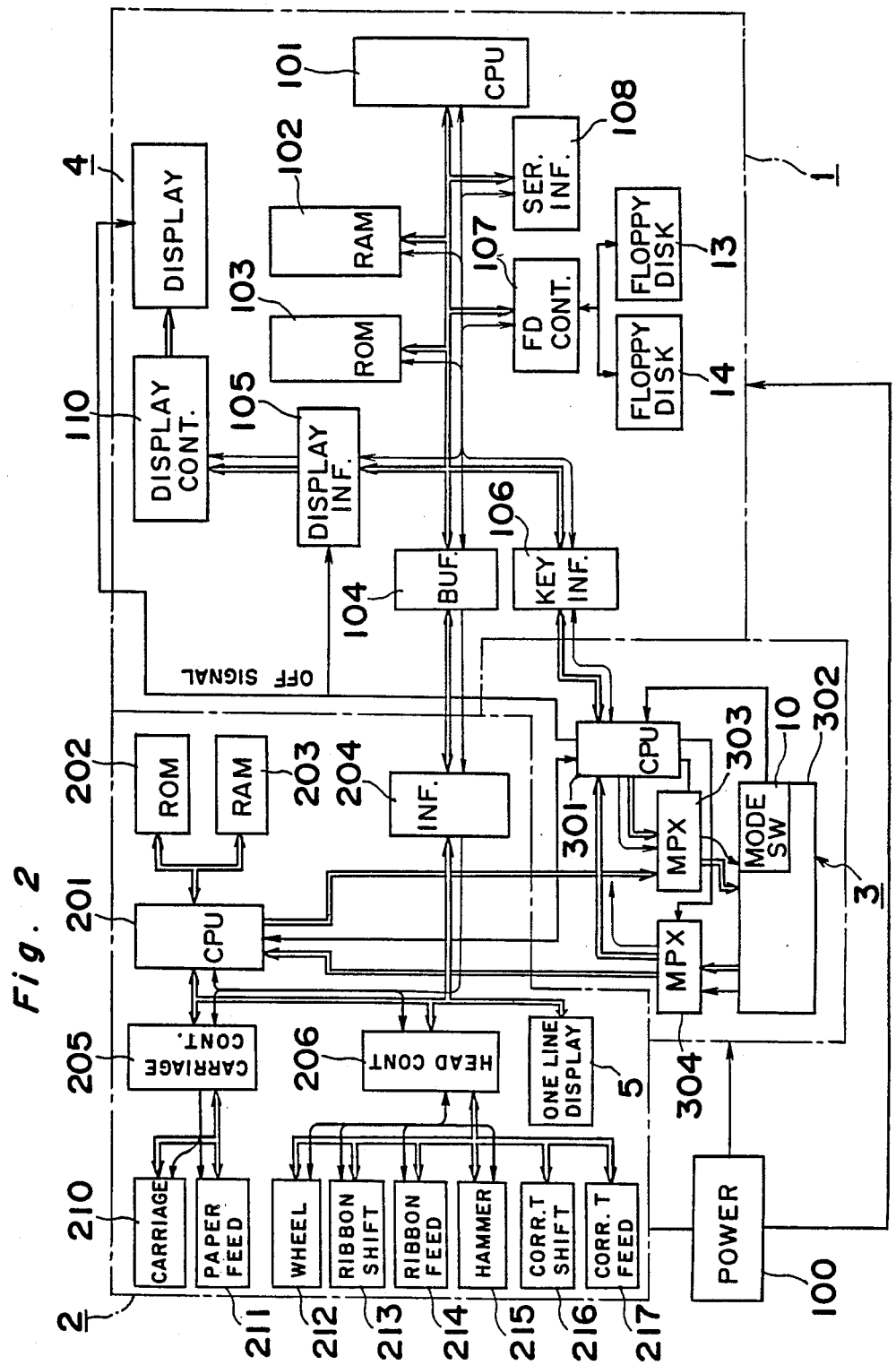
FIG. 2 is a block diagram of the electronic typewriter of FIG. 1, particularly showing the data flow when using under the personal computer mode.

FIG. 2 shows a block diagram of the PC typewriter together with data flow arrows under the PC mode. In the computer portion 1 in FIG. 2, there are provided a CPU 101 coupled to a ROM 103 and a RAM 102 to store system programs and various data to be utilized by CPU 101. The computer portion 1 further includes a buffer 104, a display interface 105, a key interface 106, a floppy disk controller 107 to control the floppy disks 13 and 14, a serial interface 108 to connect peripheral units to the computer portion 1, and a display controller 110 to control a liquid crystal display (referred to as LCD) 4 provided with a back light panel. The RAM 102 stores an application program and processing data inputted by the keys of the keyboard 302 or the floppy disks 13 and 14. When the PC typewriter functions as a word processor, the RAM 102 stores the editing program of the word processor. In accordance with the editing program stored in RAM 102, the CPU 101 performs an editing of the data inputted by the keys of the keyboard 302. The ROM 103 stores system programs and generates character patterns. The buffer 104 is a bidirectional buffer for transferring data to the printer portion 2 when the data from the computer portion 1 is needed to be printed. The display interface 105 provides the display controller 110 with data and timing signals. In response to a key depression, the key interface 106 transmits a code signal corresponding to the depressed key from the keyboard 302 to CPU 101.

As shown in the typewriter portion 2 of FIG. 2, CPU 201 is connected with a ROM 202 and a RAM 203 for storing system programs and other data. The typewriter portion 2 is further provided with an interface 204 connected to the computer portion 1, a carriage controller 205, a head controller 206, and a one line display 5. The carriage controller 205 and the head controller 206 are operated under the PC mode by the commands from the computer portion 1. The carriage controller 205 controls a carriage driving circuit 210 for moving a carriage and a paper feed driving circuit 211. The paper feeding is performed by the rotation of a platen mounted on the typewriter. The head controller 206 controls a daisy-wheel driving circuit 212 for rotating the daisy-wheel type element; a printing ribbon shift driving circuit 213 for vertically shifting a printing ribbon to printing and non-printing positions; a printing ribbon feed driving circuit 214 for feeding the printing ribbon laterally; a hammer driving circuit 215 for giving a hammer impact onto the platen under an appropriately controlled pressure; a correction tape shift circuit 216 for vertically shifting a correction tape; and a correction tape feed circuit 217 for laterally feeding the correction tape. The correction tape shift circuit 216 and the correction tape feed circuit 217 are operable only under the typewriter mode. The CPU 201 operates according to the data transferred from the ROM 202 which stores system programs of the typewriter the tables of the characters of the daisywheel, and the positions in which the characters are printed; the RAM 203 which is used as the area of buffers of various functions such as an editing function; the interface 204 which provides with the CPU 201 printing data; and control commands transferred from the computer portion 1. Under the typewriter mode, CPU 201 produces commands to print characters on a sheet, or to erase characters printed on the sheet with a correction tape, according to the signals transmitted from the keyboard 302 through the multiplexer 304. Under the computer mode, such a correction function is not performed, and a print control is carried out by the CPU 201 according to the data transferred from the interface 204.

Keyboard 302 in FIG. 2 includes a CPU 301 coupled to multiplexers 303 and 304. When the mode selection key 10 is switched to the PC mode, a signal representing the PC mode is applied to CPU 301, which then provides signals to multiplexers 303 and 304 so that the bidirectional data communication can be carried out between CPU 301 and keyboard 302. Also, when the mode selection key 10 is switched to the PC mode, CPU 301 carries out the key scan of the keyboard 302 in accordance with the system's programs. Through multiplexer 303, CPU 301 provides the keyboard 302 with key scan signals at a very high frequency to find out if any of the keys is depressed. If one of the keys is depressed, a signal indicating the depression of that key is fed back to CPU 301 through multiplexer 304, as indicated by arrows shown in FIG. 2. Thereafter, CPU 301 produces a code signal representing the depressed key, through key interface 106, to CPU 101.

On the other hand, when the mode selection key 10 is switched to the typewriter mode, a signal representing the typewriter mode is applied to CPU 301, which then provides signals to multiplexers 303 and 304 so that the bidirectional data communication can be carried out between CPU 201 and keyboard 302. Also, the signal representing the typewriter mode is transmitted from mode selection key 10, through CPU 301, to CPU 201. Accordingly, CPU 201 carries out the key scan of the keyboard 302 in accordance with the system's programs. Through multiplexer 303, CPU 201 provides the keyboard 302 with the key scan signals in a similar manner as described above, and a signal indicating the depression of a key is fed back to CPU 201 through multiplexer 304. It is to be noted that some keys are operable only in the PC mode and other keys are operable only in the typewriter mode.

Figure 3:
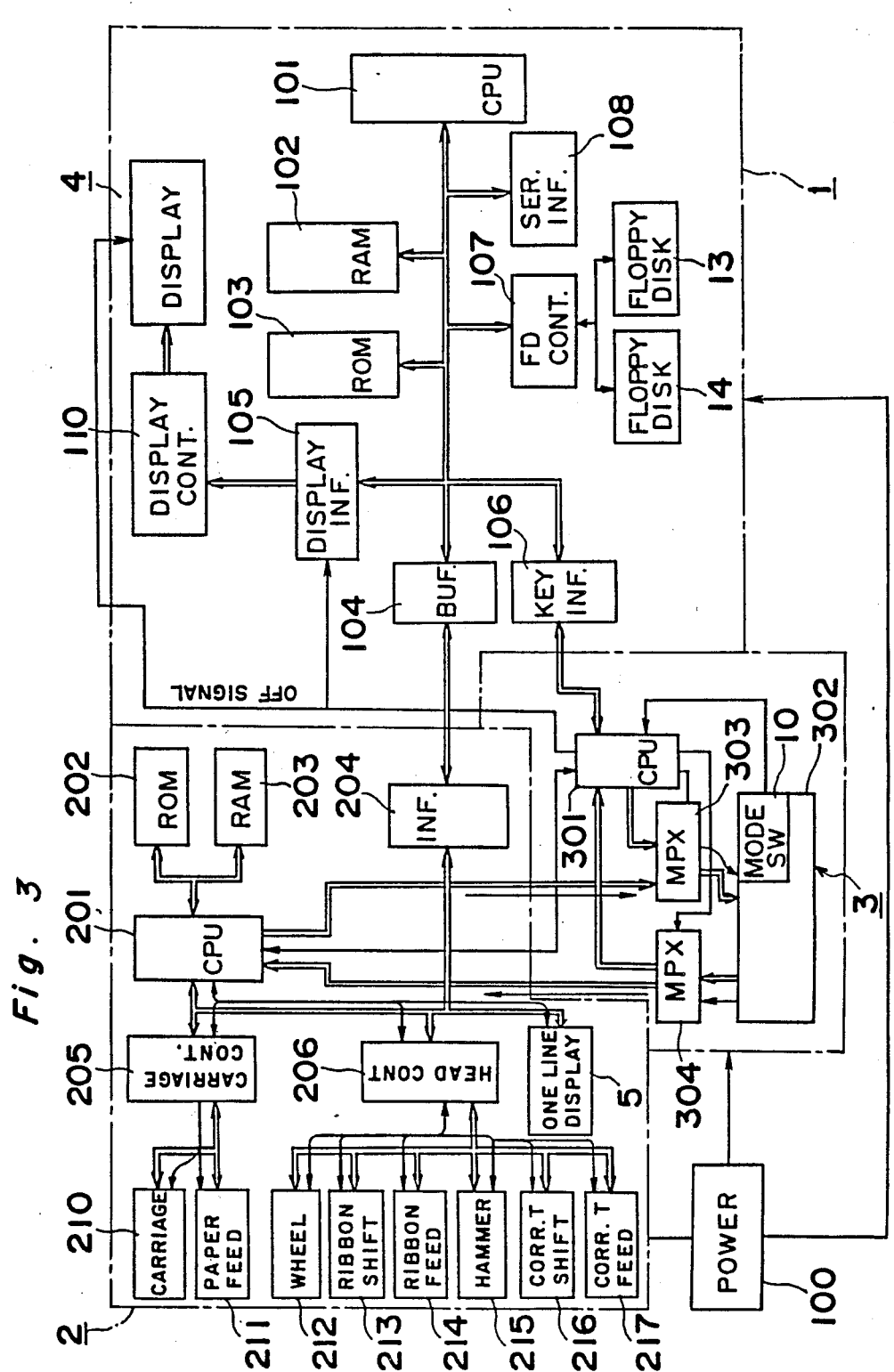
FIG. 3 is a block diagram which is the same as that shown in FIG. 2, but particularly showing the data flow under the typewriter mode.

Furthermore, during the typewriter mode, CPU 301 provides the display controller 110 and the display interface 105 with an OFF signal. A power source circuit 100 is provided as shown in FIGS. 2 and 3 to supply necessary electric power to the circuits.

Figure 4:
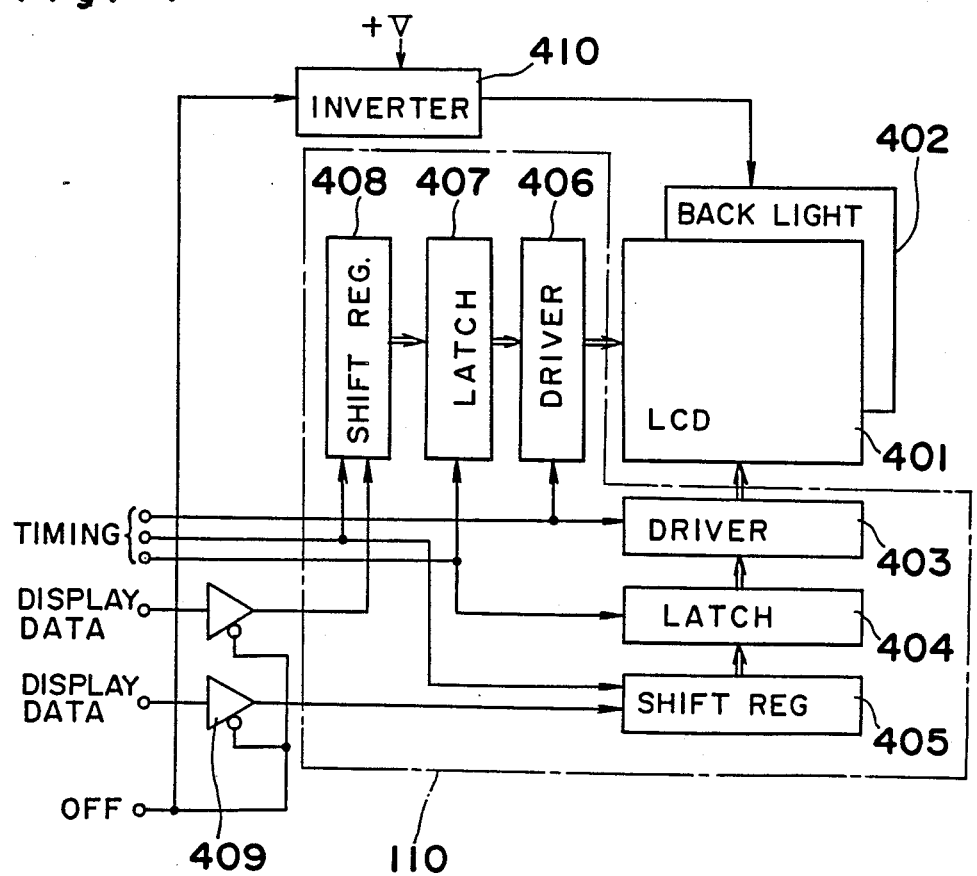
FIG. 4 is a block diagram of a display unit used in combination with the personal computer.

Referring to FIG. 4, display unit 4 comprises LCD 401 and a back light panel 402 composed of a cold cathode ray type. The LCD 401 has pixels arranged in a matrix, and each pixel becomes opaque when the driving electric potential applied between the row and column lines of the pixel becomes higher than a predetermined electric potential. Thus, the pixel is illuminated by the back light panel 402. When the driving electric potential applied between the lines is lower than the predetermined electric potential, the light transmitted from the back light panel 402 permeates the LCD 401. The back light panel 402 is lighted upon receipt of an AC signal transmitted from a converter 410 which converts DC current into AC current upon application of DC power source +V when an OFF signal is not transmitted to it. When an OFF signal is applied to the inverter 410, it stops oscillating, thus an AC signal is not produced, with the result that the intensity of the back light attenuates. During this condition, the back light is not allowed to permeate through the LCD 401, so that the characters displayed on the LCD 401 will become faded or not seen. As shown in FIG. 4, the display controller 110 is composed of shift register 405 and 408, latch circuits 404 and 407, and drivers 403 and 406. In the PC mode, timing signals and dot data to be fed from the display interface 105 are serially transferred to the shift registers 405 and 408 through the display interface 105 which includes switching gates 409. The shift registers 405 and 408 provide the latch circuits 404 and 407 with the dot data. Drivers 403 and 406 consisting of segments in rows and columns provide signals to LCD 401 according to the dot data which is transferred from latch circuits 404 and 407. When an OFF signal is transferred from the CPU 301 to the switching gates 409, the switching gates are disabled. Thus, the shift registers 405 and 408 will not stores any data to be displayed.

The operation of the PC typewriter of this embodiment according to the present invention is described below.

When the PC typewriter is set to the PC mode manually via mode selection switch 10, a signal is transmitted, as shown by arrows in FIG. 2, to CPU 201 through CPU 301. The CPU 201 carries out the system program stored in the ROM 202 to be used in the PC mode upon receipt of character data and printing commands transmitted through interface 204 from CPU 101. In the computer portion 1, the CPU 101 becomes operable when any one of the code signals is transmitted to it through the key interface 106 upon depression of a key. That is, data outputted from the keyboard 302 is processed by the computer portion 1. For example, when the PC typewriter is functioning as a word processor, the data transferred from the keyboard 302 is applied to display controller 110 through the display interface 105, thereby displaying the data on the LCD 401. The data is also stored in RAM 102 or on a floppy disk.

According to a character printing instruction transferred from the keyboard 302, the data stored in the RAM 102 is transferred; a certain number of bits at a time, such as bits sufficient to accommodate one line data; to CPU 201 through buffer 104 and interface 204. Then, CPU 201 temporarily stores the data in RAM 203 and operates the carriage controller 205 and the head controller 206 to carry out one line of printing corresponding to the temporarily stored data.

When the computer mode is switched to the typewriter mode manually via mode selection switch 10, the signal produced by pressing the keys of the keyboard 302 is transmitted, as shown by arrows in FIG. 3, to the CPU 201. At this time, CPU 301 outputs an OFF signal, thereby disabling the switching gate 409. Accordingly, characters displayed on the LCD 401 disappear and the converter 410 is not oscillating; and therefore, the back light is turned off. Thus, the operator can confirm that the PC typewriter is now in the typewriter mode. This makes it easy for the operator to check whether the PC typewriter is in the typewriter mode or not.

The computer portion 1 and the typewriter portion 2 are provided with different CPUs, respectively in this embodiment; however, a key scan may be performed by only one CPU.

According to this embodiment, an LCD unit for use in the computer mode equipped with the back light panel 402 is used, however, a CRT (cathode-ray tube) or an EL (electroluminescence) may be used. In such a case, the control is carried out by cutting a power supply to a high voltage circuit connected thereto.

Figure 5:
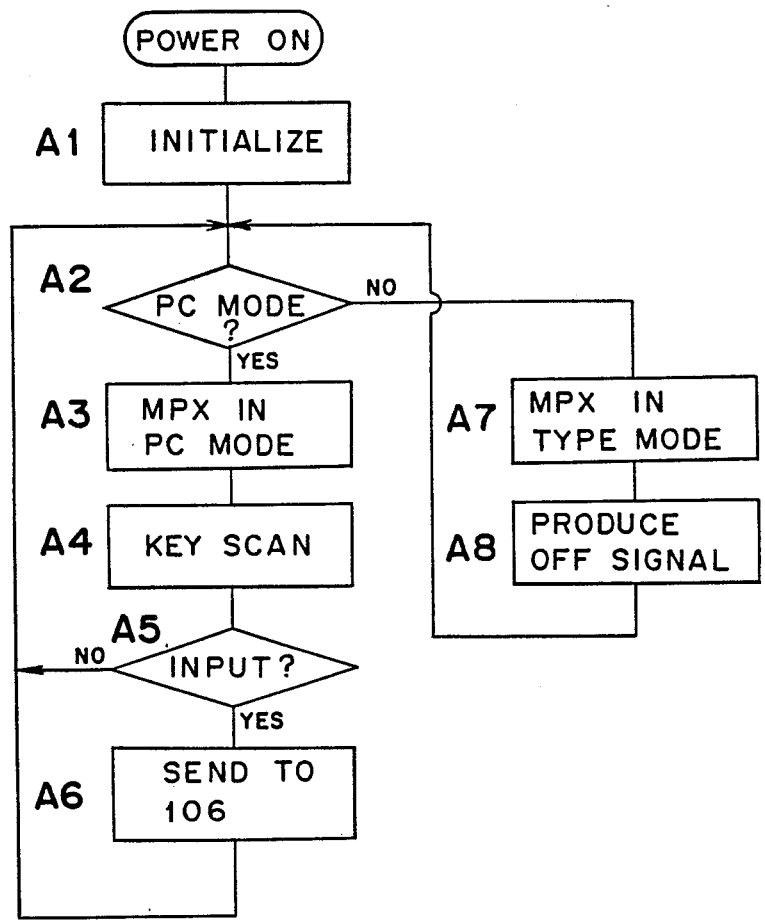
FIG. 5 is a flow chart showing an operation carried out by a CPU provided for controlling the keyboard portion of the electronic typewriter equipped with the personal computer.

The operation of the CPU 301 will be described in connection with the flow chart shown in FIG. 5.

At step A1, CPU 301 is initialized. At step A2, it is detected whether or not the mode is the PC mode. If yes, the program goes to step A3 at which multiplexers 303 and 304 are operated to enable the communication between CPU 301 and keyboard 302. The program then proceeds to step A4 at which key scans are carried out. At step A5, it is detected whether or not any data is inputted. If no data is inputted, program returns to step A2. If data is inputted, the program goes to step A6 at which the data which has been coded in the CPU 301 is transferred to the key interface 106. Then, the program returns to step A2. In this manner, the operation is repeated. If it is detected at step A2 that the mode is not the PC mode, the multiplexers 303 and 304 are operated to enable the communication between CPU 201 and keyboard 302. Then, the program proceeds to step A8 at which an OFF signal is produced, so that switching gate 409 shown in FIG. 4 is disabled, resulting in that the characters being displayed on LCD 401 disappear. The program then returns to step A2.

Figure 6:
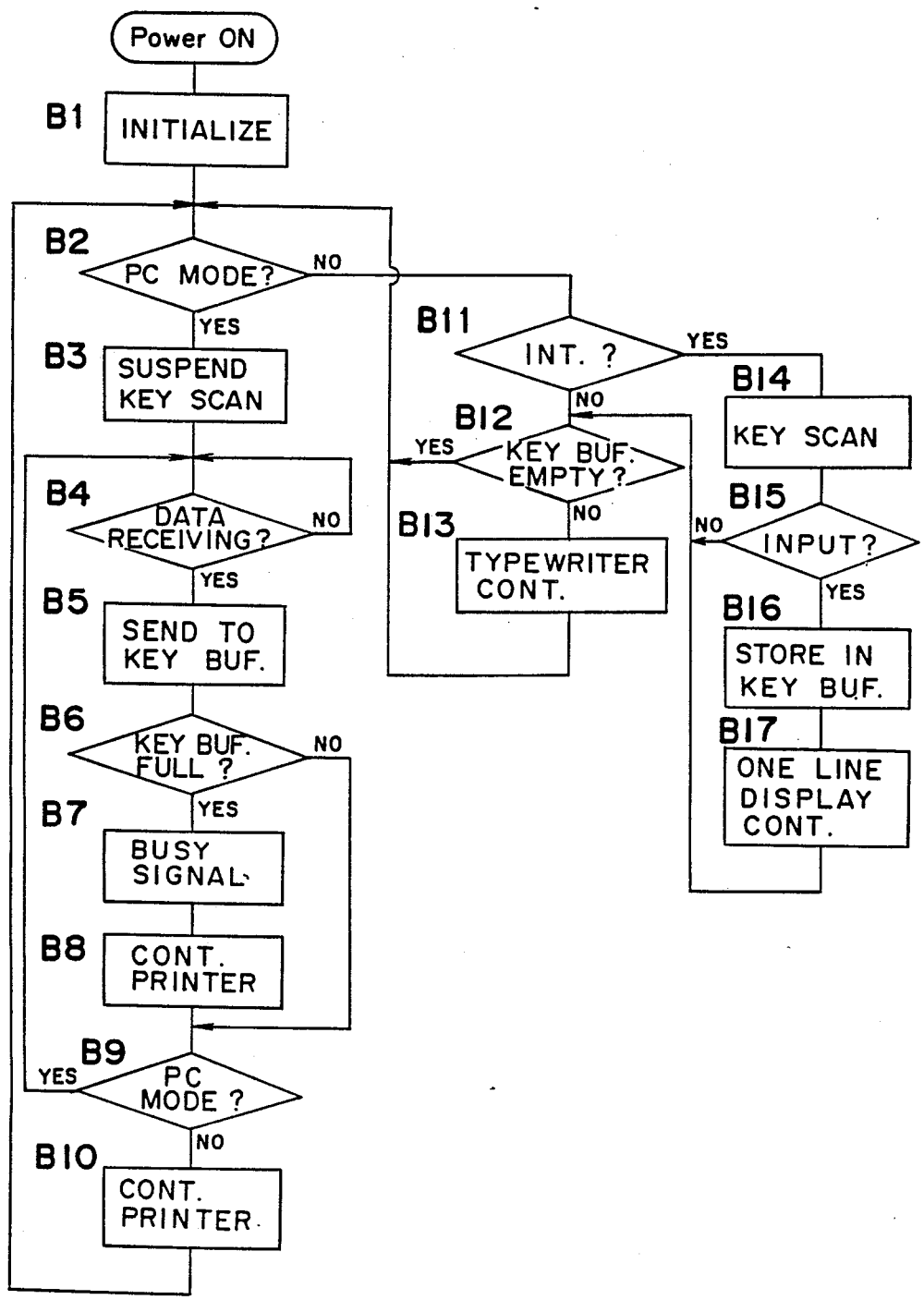
FIG. 6 is a flow chart showing an operation carried out by a CPU provided for controlling the typewriter portion of the electronic typewriter equipped with the personal computer.

Next, the operation of CPU 201 will be described in connection with the flow chart shown in FIG. 6.

At step B1, CPU 201 is initialized. At step B2, it is detected whether or not the mode is the PC mode. If the PC mode is detected, the program proceeds to step B3 at which a key scan is suspended. Then, the program proceeds to step B4 at which it is detected whether or not any data is transferred from the interface 204. If no data is transferred, the program repeats step B4 to wait for the data. If data is transferred, the program proceeds to step B5 at which the received data is transferred to and temporarily stored in the key buffer provided with RAM 203. Then, the program proceeds to step B6 at which it is detected whether or not data stored in the key buffer in the RAM 203 is filled with one line of data. If the key buffer is not filled with one line of data, the program jumps to step B9. If one line of data is present, the program proceeds to step B7 at which a busy signal is transmitted to the interface 204 indicating that the key buffer is full. Then, the program proceeds to step B8 at which the printing of the one line of data in the key buffer is carried out. Thereafter, the program proceeds to step B9 at which it is detected whether or not the mode is the PC mode. If the PC mode is detected, the program returns to step B2. If the PC mode is not detected that is, when the operator switches the mode selection switch 10 to the typewriter mode, the program proceeds to step B10 at which the printing of the one line of data now being carried out is continued so as to delay the mode change until after the printing of the one line of change after data stored in the key buffer. Then, the program returns to step B2.

If it is detected at step B2 that the selected mode is not the PC mode, the program proceeds to step B11 at which it is detected whether or not an interruption has taken place. If no interruption has taken place, the program proceeds to step B12 at which it is detected whether or not the key buffer provided with the RAM 203 is empty. If the memory is not empty, the program proceeds to step B13 at which an inputted data is displayed on the one line display 5 and the electronic typewriter control is carried out by operating circuits 210-217. Then, the program returns to step B2. If an interruption has been deleted at step B11, the program proceeds to step B14 at which key scans are carried out. Then, the program proceeds to step B15 at which it is detected whether or not any data has been inputted. If no data has been inputted, the program proceeds to step B12. If data has been inputted, the program proceeds to step B16 at which the inputted data is stored in the key buffer provided in RAM 203. Then, the program proceeds to step B17 at which the inputted key data is displayed on one line display 5. Then, the program proceeds to step B12, and then, proceeds to step B13, and thereafter, returns to step B2.

As described above, the PC typewriter according to the present invention can be used as an electronic typewriter immediately while the PC typewriter is being operated as a personal computer.

Although the present invention has been fully described in connection with its preferred embodiments with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An electronic typewriter equipped with a personal computer comprising:
    a first processing unit including,
        processing means for controlling operations of said first processing unit,
        storing means for storing a user application program, and
        display means for displaying data processed according to user application program;
    interface means, operatively connected to said first processing unit, for transferring data to and from said first processing unit;
    a second processing unit, coupled to said first processing unit through said interface, for controlling a printer according to data transferred from said interface;
    keyboard means, including character input keys and function keys, for inputting data to a selected one of said first processing unit or said second processing unit, exclusive of the other;
    selection switch means, operatively connected to said first processing unit and said second processing unit, for selecting one of two modes, said modes causing only one of said first processing unit or said second processing unit to operate and receive said inputted data; and
    distribution means, operatively connected to said keyboard means, for distributing data outputted from said keyboard means to either said first processing unit or said second processing unit according to the mode selected by said selection switch means, said data being processed by either said first processing unit or said second processing unit according to the mode selected.

2. The electronic typewriter equipped with a personal computer as claimed in claim 1, wherein said display means comprises a liquid crystal display provided with a back light.

3. An electronic writing device for directly typing non-processed data and non-directly printing word processed data onto a single document, comprising:
    input means for inputting data to be typed directly or to be word-processed;
    first processing means, operatively connected to said input means, causing the inputted data to be word processed according to a user application program;
    said first processing means including,
        a first central processing unit.
        first storing means, operatively connected to said first central processing unit, for storing said user application program, and
        display means, operatively connected to said first central processing unit, for displaying the inputted data being processed according to said user application program;
    second processing means, operatively connected to said input means, for causing the inputted data to be typed directly onto the single documents; and
    selection means, operatively connected to said input means, for selecting either a typing mode or a processing mode, said typing mode activating said second processing means and said processing mode activating said first processing means, said typing mode causing said second processing means to receive said inputted data exclusive of said first processing means, said first processing means resuming normal operations upon termination of said typing mode by said selection means.

4. A method for printing documents using an electronic writing apparatus, the electronic writing apparatus having a first processing unit for processing and non-directly printing data o be word processed and a second processing unit for typing non-processed data directly onto a document, comprising the steps of:
    (a) determining if the electronic writing apparatus is in a personal computer mode or in a typewriter mode;
    (b) receiving word-processed data in a line-by-line manner from a memory when said step (a) has determined that the electronic writing apparatus is in the personal computer mode;
    (c) printing the received word-processed data of said step (b) onto a document in a line-by-line manner when said step (a) has determined that the electronic writing apparatus is in the personal computer mode;
    (d) repeating said steps (a), (b), and (c) until said step (a) determines that the electronic writing apparatus is in the typewriter mode;
    (e) causing the first processing unit to not receive word-processed data when said step (a) determines that the electronic writing apparatus is in the typewriter mode;
    (f) activating the second processing unit so that the second processing unit causes nonword-processed inputted data to be directly typed upon the document being printed; and
    (g) repeating said steps (a) and (f) until said step (a) determines that the electronic writing apparatus is in the personal computer mode; said step (d) is executed upon determination that the electronic writing apparatus is in the personal computer mode in said step (a), thereby allowing insertion of nonword-processed data into a document without terminating the personal computer mode.

5. The method as claimed in claim 4, further comprising the steps of:
    (h) displaying the nonword-processed inputted data being directly typed upon the document when said step (a) has determined that the electronic writing apparatus is in the typewriter mode; and
    said step (g) further repeating said step (h) along with said steps (a) and (f).

6. The method as claimed in claim 4, further comprising the steps of:
    (h) displaying the word-processed data only during the personal computer mode.

* * * * *